United States Patent [19]

Kempen

[11] Patent Number: 5,178,263
[45] Date of Patent: Jan. 12, 1993

[54] MODULAR TRACK SECTION FOR AN ENDLESS CONVEYOR

[75] Inventor: Byron J. Kempen, Raleigh, N.C.

[73] Assignee: International Paper Company, Purchase, N.Y.

[21] Appl. No.: 799,256

[22] Filed: Nov. 27, 1991

[51] Int. Cl.⁵ ............................................. B65G 15/60
[52] U.S. Cl. .................................. 198/836.1; 198/841; 198/860.2; 198/860.3; 198/861.1
[58] Field of Search .................. 198/841, 836.1, 836.4, 198/860.2, 860.3, 861.1, 860.1

[56] References Cited

U.S. PATENT DOCUMENTS

| | | | |
|---|---|---|---|
| 1,854,560 | 4/1932 | Owens et al. | 198/860.3 |
| 3,312,330 | 4/1967 | Juengel. | |
| 3,581,877 | 6/1971 | Goldberg | 198/836.1 |
| 3,605,994 | 9/1971 | Parlette. | |
| 3,825,108 | 7/1974 | Stone | 198/861.1 |
| 3,881,594 | 5/1975 | Jepsen | 198/841 X |
| 4,358,010 | 11/1982 | Besch. | |
| 4,511,031 | 4/1985 | Lachonius | 198/836.1 |
| 4,535,963 | 8/1985 | Lachonius. | |
| 4,545,477 | 10/1985 | Besch. | |
| 4,556,143 | 12/1985 | Johnson. | |
| 4,664,253 | 5/1987 | Fahrion | 198/841 X |
| 4,732,268 | 3/1988 | Sjostrand. | |
| 4,856,656 | 8/1989 | Sjostrand. | |
| 4,934,516 | 6/1990 | Dugan | 198/841 X |
| 4,951,809 | 8/1990 | Boothe et al. | 198/841 |
| 4,961,492 | 10/1990 | Wiseman et al. | 198/841 |
| 4,967,897 | 11/1990 | Lachonius et al. | 198/841 |
| 5,082,108 | 1/1992 | Douglas | 198/841 X |

FOREIGN PATENT DOCUMENTS

| | | | |
|---|---|---|---|
| 3231868 | 3/1984 | Fed. Rep. of Germany | 198/841 |
| 2069442 | 8/1981 | United Kingdom | 198/841 |

Primary Examiner—D. Glenn Dayoan
Attorney, Agent, or Firm—Walt Thomas Zielinski

[57] ABSTRACT

An endless chain conveyor system employing modular track units. The track is of a ultra high molecular weight plastic and is of generally horizontal I-shape in transverse cross section. Each side of the track includes a longitudinal slot running the entire, predetermined length of each modular track. Side mounting rails of stainless steel are positioned within each slot. The side rails rigidify and strengthen the plastic track, permitting a smaller cross section track to be used, and also inhibit tearing of the track units of their joined ends. The track units are made of predetermined lengths, such as one foot, two feet, etc., and are used to construct endless conveyors of any desired length. The track units may also be curved to any desired angle.

7 Claims, 3 Drawing Sheets

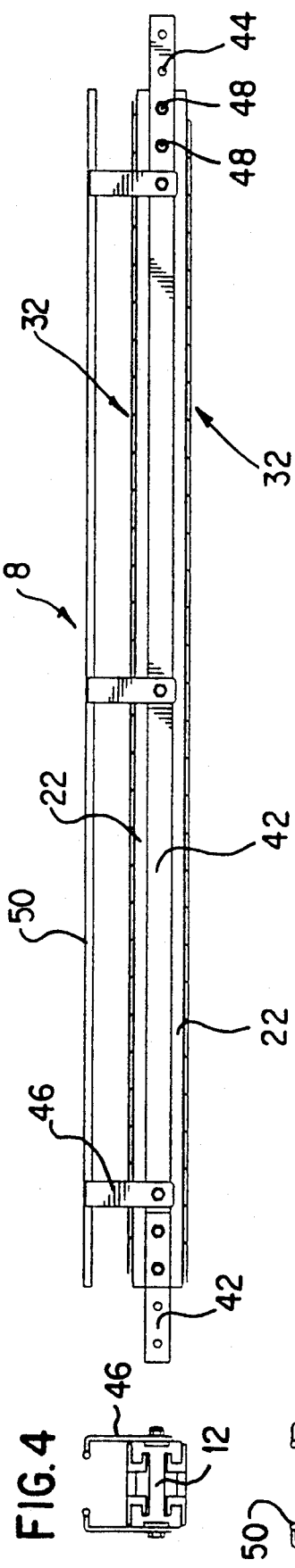
FIG. 3
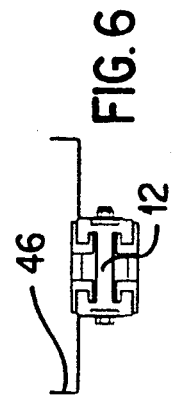
FIG. 4
FIG. 5
FIG. 6

MODULAR TRACK SECTION FOR AN ENDLESS CONVEYOR

BACKGROUND OF THE INVENTION

This invention relates to an endless conveyor of the type including modular track units of predetermined lengths which receive and support an endless belt or chain. Such apparatus is useful in manufacturing operations wherein articles are placed at one location on the conveyor and are transmitted by the chain to another location in, for example, a factory.

The invention more particularly relates to an improvement in endless conveyors, built up from modular units wherein the track is fashioned of ultra high molecular weight plastic to reduce weight and size of the apparatus and the units are joined together to a desired total conveyor length. Such weight and size reduction is particularly useful when the apparatus is shipped in an unassembled condition to a factory and when reassembled at a factory. While plastic tracks formed of such plastic materials are known, such as shown by U.S. Pat. No. 4,556,143 issued to P. A. Johnson, endless conveyors formed therefrom exhibit a disadvantage that the track sometimes become warped or bent under the weight of the articles transported by it. A further disadvantage of known plastic track constructions is the relative difficulty in joining them which increases the weight and size of the endless conveyor.

SUMMARY OF THE INVENTION

According to the practice of this invention, an endless conveyor of the plastic modular track type is provided with a specific means of joining the modular units and inhibiting bending and tearing of the plastic with minimal usage of metal for support. The invention further displays a modular unit advantage in that it is relatively easy to add sections of these modular units for the purpose of increasing the length of the endless conveyor as well as changing its direction. The specific side mounting means employed enables a modular type of construction and also strengthens the plastic track without increasing the overall conveyor size. By virtue of the construction, the joints between track sections receive sufficient support to prevent bending and tearing of the plastic. The side mounting arrangement thus serves dual functions.

BRIEF DESCRIPTION OF THE DRAWINGS

FIG. 3 is a side elevational view of a typical modular section, and illustrates one side stiffening rail of an adjacent modular section.

FIGS. 4 to 6 are transverse cross sectional views illustrating variations in guide rail spacing.

DETAILED DESCRIPTION OF THE INVENTION

Figure 1:
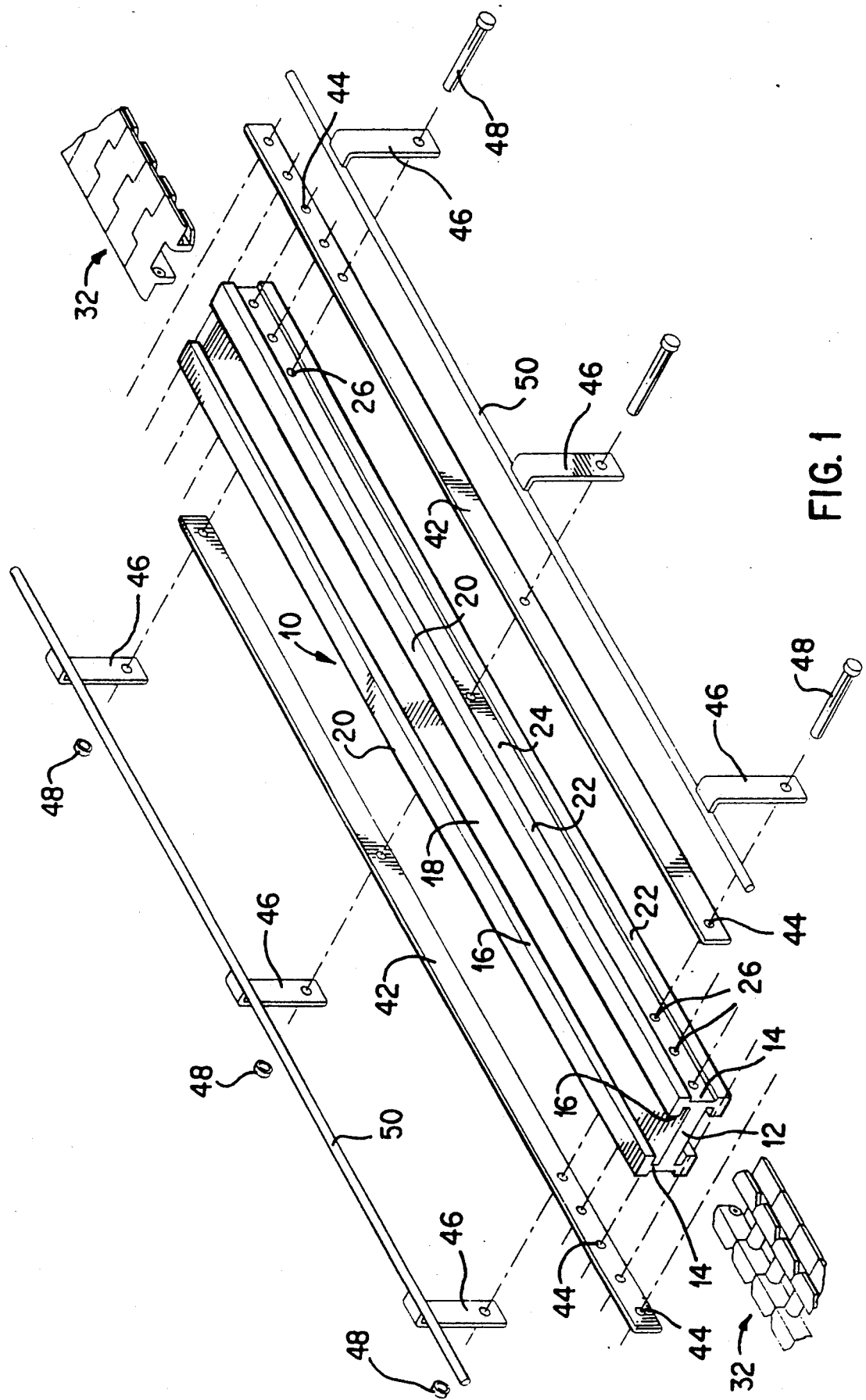
FIG. 1 is a perspective exploded view illustrating elements of the endless conveyor of this invention prior to their assembly.
Figure 2:
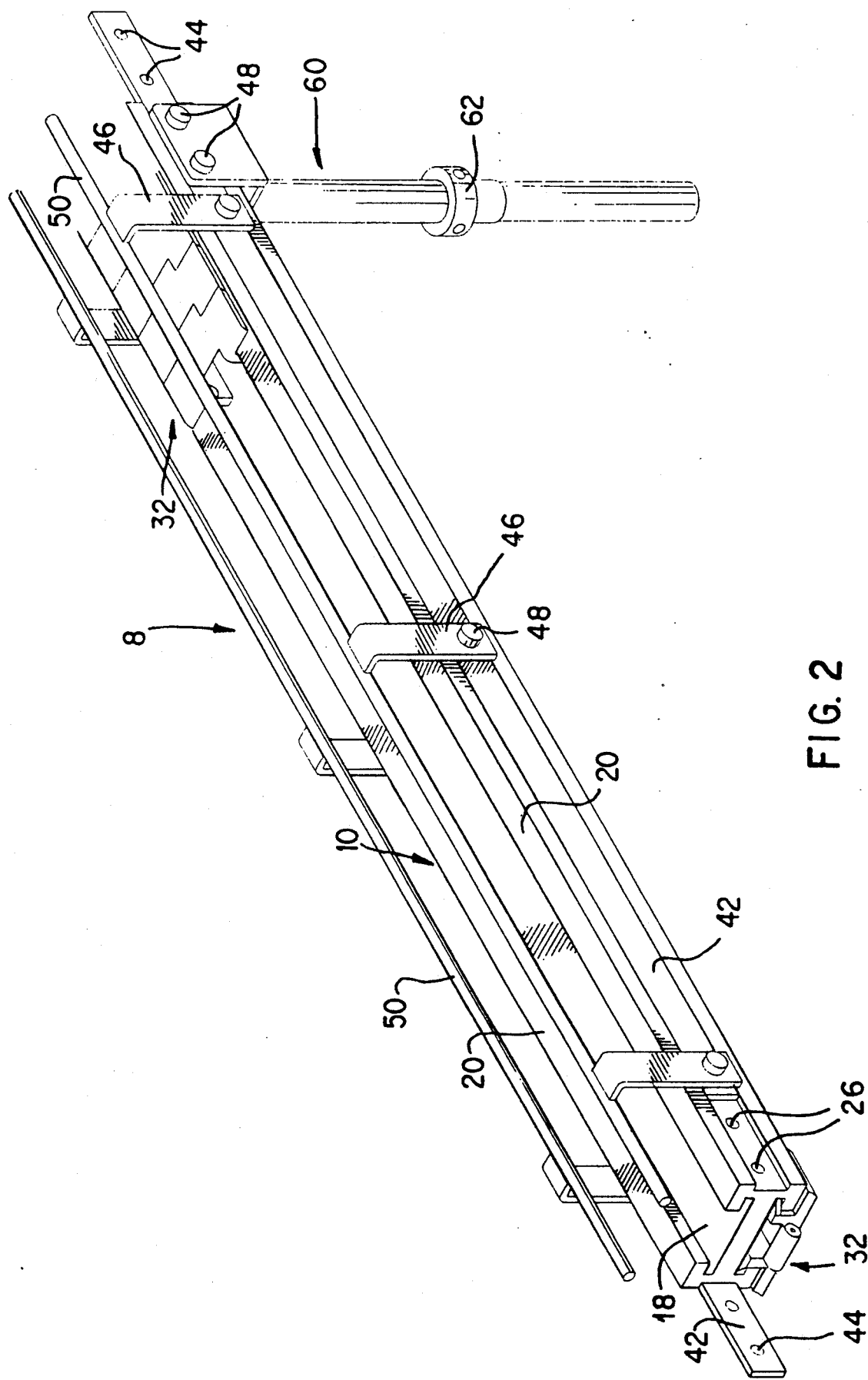
FIG. 2 is a view similar to FIG. 1 and illustrates a typical modular unit of the conveyor after assembly, and including a vertical support.

Referring now to FIGS. 1 and 2 of the drawings, a typical modular section of an endless conveyor according to the practice of this invention is illustrated. An integral, modular track section of generally horizontal I-shape in transverse cross section is denoted as 10 and includes a central, horizontal web 12 having perpendicular end sections 14. The upper and lower ends of sections 14 each terminate in flat rails 20, the latter having outer vertical sides 22 and inner vertical sides 16. Track 10 is formed of ultra high molecular weight (UHMW) plastic material. Such material is known, and one supplier is Solidur Plastics Co. of Delmont, Pa.

Opposite, facing surfaces 16 are positioned a slight distance above horizontal surface 18 of central web 12. Vertical surfaces 16 represent the innermost portions of opposite flat rails 20. Vertically disposed outer surfaces of flat rails 20 are denoted as 22 and are parallel to surfaces 16. Each of a plurality of openings 26 extends horizontally through web 12.

An endless plastic conveyor chain 32, of known construction, passes over upper web surface 18 and also passes over lower web surface 18, the latter not seen in either FIGS. 1 and 2 the chain may also be formed of metal. Each link of endless chain 32 includes an upper portion of a width substantially the same as the width of track section 10 and a lower portion of substantially the same width as the slot defined by surface 18 and rails 20. Central pins join the chain links. Chain 32 is formed from links of acetal resin, a low friction material, and one such chain which has been found satisfactory is designated as part No. LF 880 TAB-K, sold by Rexnord of Milwaukee, Wis.

An elongated side stiffening rail 42, fits into each longitudinal slot defined by opposite side surfaces 24 of the track and both upper and lower rails 20 at each track side. There is a stiffening rail 42 fastened along each side of the conveyor, with each stiffening rail having spaced openings 44. At one end, a single opening 44 is provided and an opening 44 is also provided centrally of each rail. The other end of each rail carries five such openings 44, with the arrangement being such that, as shown at FIGS. 1 and 2, one side of track section 10 carries a stiffening rail 42 which extends beyond one end of the track on one side, while falling short of the opposite end of the track. Similarly, the opposite or near stiffening rail 42, as viewed at FIGS. 1 and 2, falls short of the first end of the track and extends beyond the second or most remote end of the track, as viewed at FIGS. 1 and 2. Each stiffening rail 42 is typically of stainless steel or other hard, strong metal and is rectangular in transverse cross section.

Each of a plurality of vertically disposed hangers 46 carries at its lower end an opening which receives a fastener 48, the latter typically an elongated bolt and associated nut, or any other known fastening element. Fasteners 48 extend through track openings 26. The upper portions of vertically disposed hangers 46, on one side of the track section, are provided with a first guide rod 50, while the hangers at the other side of the track carry a second guide rod 50. These rods function to maintain the articles transported by the endless chain 32 aligned. Guide rods 50 and hangers 46 may be omitted, or may assume different forms.

Vertical support standards 60, only one of which is shown at FIG. 2, each carry a U-shaped, apertured bracket which receives fasteners 48, the latter passing through stiffening rail openings 44 and track openings 26. An intermediate set collar 62 may be included. The number and height of supports 60 will vary according to load requirements. These supports are similar to pedestal 14 and bracket 16 of U.S. Pat. No. 3,605,994 issued to Parlette.

FIG. 3 further illustrates the typical modular unit of FIG. 2, but without a vertical support 60. At the left, a stiffening rail 42 from an adjacent modular unit (not shown) is seen as positioned in the lower left slot of FIG. 2.

When joining a typical modular unit, the right hand or nearest stiffening rail 42 of any section will fit into the side slot at the lower left portion of FIG. 2, and will receive two fasteners 48. Similarly, the left hand rail 42 of FIG. 2 will fit into a corresponding side slot in the next modular unit. Thus, the stiffening rails on either side of any modular section are staggered. However, the rails 42 may be so oriented that both of them, for any modular track unit 10, will extend beyond the same end of the unit.

In any joint between the modular units, tearing forces caused by the weight of articles being conveyed are resisted by the two stiffening rails 42. Further, bending of any track unit 10 therealong is also resisted by the stiffening rails. Each rail 42 is shown as of the same length as each plastic track section 10. However, the invention is not limited to this length relation.

During use of the conveyor, the upper surfaces of top rail 20 can wear under the abrasive action of the top run of endless chain 32. Because each track section exhibits horizontal mirror symmetry, and because the openings 26 are central, the track section can be inverted to yield a fresh set of upper rails 20.

Referring now to FIGS. 4 to 6, it will be seen that the configuration of hangers 46 may be varied to accommodate articles having different widths.

This construction, in distinction to known constructions employing a plastic track, permits the use of a plastic material for the track to thereby yield savings in weight, while providing the assembled tracks with rigidity and strength imparted by the stainless steel or other steel of the stiffening side rails. Hangars 46 and guide rails 50 are typically of metal. While shown as straight, the individual modular units may be curved to any desired angle. In such cases the track, the side stiffening rails, and all other elements associated with a modular element or curve.

I claim:

1. A modular unit for an endless conveyor, said unit including an elongated, integral plastic track section of predetermined length having a central, horizontal web and two perpendicular end sections, the latter defining the sides of the track, said trace being generally horizontal I-shaped in transverse cross-section, a longitudinal, open sided slot running along the length of the outer sides of said end sections of each of track section, at least one stiffening side rail fitting into each said longitudinal slot, said slots being of uniform width throughout and of a width substantially equal to the width of said stiffening side rails, at least one of said stiffening side rails extending beyond an end of the track section, said slots being at substantially the same level as said horizontal web, at least one said stiffening side rail secured to a generally upwardly extending support hanger.

2. The modular unit of claim 1 including an upper run of an endless conveyor chain on the top of said central web of said plastic track and a lower run of said endless chain along the bottom of said central web.

3. The modular unit of claim 2 wherein said conveyor chain is of plastic.

4. The modular unit of claim 1 wherein said stiffening side rails are rectangular in transverse cross section and are of a hard metal.

5. The modular unit of claim 1 including a plurality of fasteners clamping said stiffening rails to the track, said support hangers located along said track, the lower end of each support hanger secured to at least one of said fasteners.

6. The modular unit of claim 1 wherein the plastic track is formed of ultra high molecular weight (UHMW) plastic.

7. A modular unit for an endless conveyor, said unit including an elongated, integral plastic track section of predetermined length having a central web and two perpendicular end sections along the sides of the track, said track being generally horizontal I-shaped in transverse cross section, a longitudinal slot running along the exterior side of each of track section, at least one stiffening side rail in each said longitudinal slot, at least one said stiffening side rails extending beyond an end of the track section, at least one stiffening side rail secured to a generally upwardly extending support hanger an upper run of an endless conveyor chain on the top of said central web of said plastic track and a lower run of said endless chain along the bottom of said central web, said conveyor chain being of plastic, said stiffening side rails being rectangular in transverse cross section and of a hard metal, a plurality of fasteners clamping said stiffening rails to the track, said support hangers located along said track, the lower end of each support hanger secured to at least one of said fasteners, said fasteners extending from one side stiffening rail horizontally through the central web of the plastic track, and to the opposite side stiffening rail.

* * * * *